SEARCH ROOM
June 23, 1953 M. SILVER 2,643,329
TRACKING SYSTEM BETWEEN RECEIVER AND TRANSMITTER
Filed May 14, 1945 3 Sheets-Sheet 1
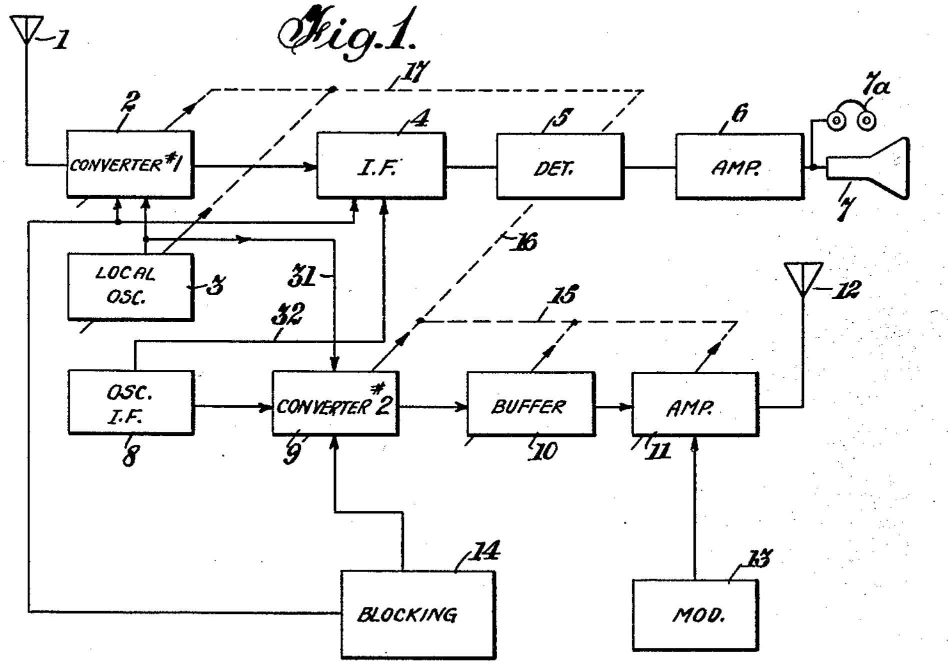
Fig.4.
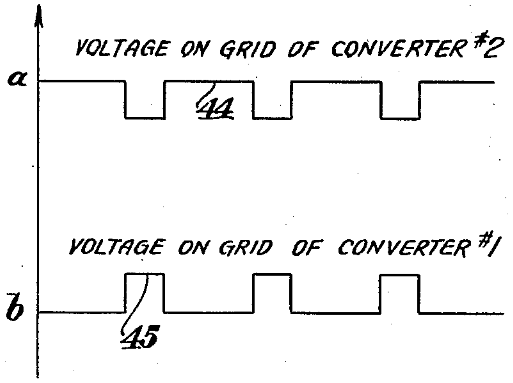
INVENTOR.
MARTIN SILVER
BY Percy P. Lantzy
ATTORNEY June 23, 1953 M. SILVER 2,643,329

TRACKING SYSTEM BETWEEN RECEIVER AND TRANSMITTER

Filed May 14, 1945 3 Sheets-Sheet 2

INVENTOR.
MARTIN SILVER

BY Percy P. Lantzy
ATTORNEY

INVENTOR.
MARTIN SILVER
BY Percy P. Lantzy
ATTORNEY

Patented June 23, 1953

2,643,329

UNITED STATES PATENT OFFICE 2,643,329

TRACKING SYSTEM BETWEEN RECEIVER AND TRANSMITTER

Martin Silver, New York, N. Y., assignor to Federal Telephone and Radio Corporation, New York, N. Y., a corporation of Delaware Application May 14, 1945, Serial No. 593,599

2 Claims. (Cl. 250—13)

This invention relates to methods and systems for tuning radio circuits and more particularly to the tuning of a transmitter by tracking the tuning of a receiver associated therewith.

Numerous applications exist in the radio communication art where a receiver and a transmitter are operatively associated with one another. In certain instances, it is desirable to seek out and ascertain the frequency of operation of a distant transmitter and to transmit a signal in response thereto or for the purpose of jamming of said transmitter having the same frequency. Generally, if a certain range of frequencies is assumed within which the distant transmitter is expected to operate, a local receiver is made to scan this range of frequencies until by a suitable indication the presence and the signal frequency of such a transmitter has been located. Thereupon, the local transmitter is tuned to the same frequency.

The systems and methods employed heretofore for carrying out the above have been characterized by a multiplicity of controls and a plurality of operations which rendered the whole operation rather complicated and frequently were quite time consuming.

It is accordingly an object of this invention to provide an improved and simplified method and means for tuning a transmitter to a given operating frequency as received and observed in a receiver associated therewith.

It is another object to provide means for tuning a transmitter to the frequency of a received signal by means of a single control on the receiver.

It is a further object to provide a tuning means for scanning a given frequency range in a transmitter which is controlled by the tuning control in a receiver associated therewith.

In accordance with my invention, I provide a superheterodyne receiver including a local oscillator which, with the help of a converter, beats down the received radio frequency signal to an intermediate frequency which is amplified and detected to provide an audio or other signal which may be observed for instance on a suitable audio or other indicating device. In association with the receiver, there is provided a transmitter, the signal or operating frequency of which is derived from an oscillator whose output is beat with that of the receiver oscillator in a second converter. The receiver is made to scan progressively a given range of frequencies by varying the frequency of the receiver oscillator resulting in a progressive variation of the effective intermediate frequency, that is, the difference between the received signal frequency and the frequency of the receiver oscillator. The varying receiver oscillator frequency is combined in the second converter, forming part of the transmitter circuit, with the output of the transmitter oscillator which has a constant frequency of value comparable to the intermediate frequency range covered by the receiver. Thus, the effective frequency of the transmitter is at any instant, substantially the same as that to which the receiver is tuned, the tracking error inherent in the fixed intermediate frequency of the transmitter oscillator being disregarded. The means for effecting a variation in the tuning of the receiver is ganged to suitable portions of the transmitter circuit so that only a single control is required. The tracking error due to variation from the intermediate frequency of the transmitter oscillator may be minimized by adding this intermediate frequency output to the receiver intermediate frequency to produce a zero beat frequency when these two frequencies are equal.

These and other objects and features of my invention will be better understood from the detailed description of one embodiment thereof made with reference to the accompanying drawings in which:

Fig. 1 is a representation in block form of a combination receiver-transmitter incorporating my invention;

Fig. 4 illustrates in graph form various operative voltages in the circuit of Fig. 1.

Figure 2:
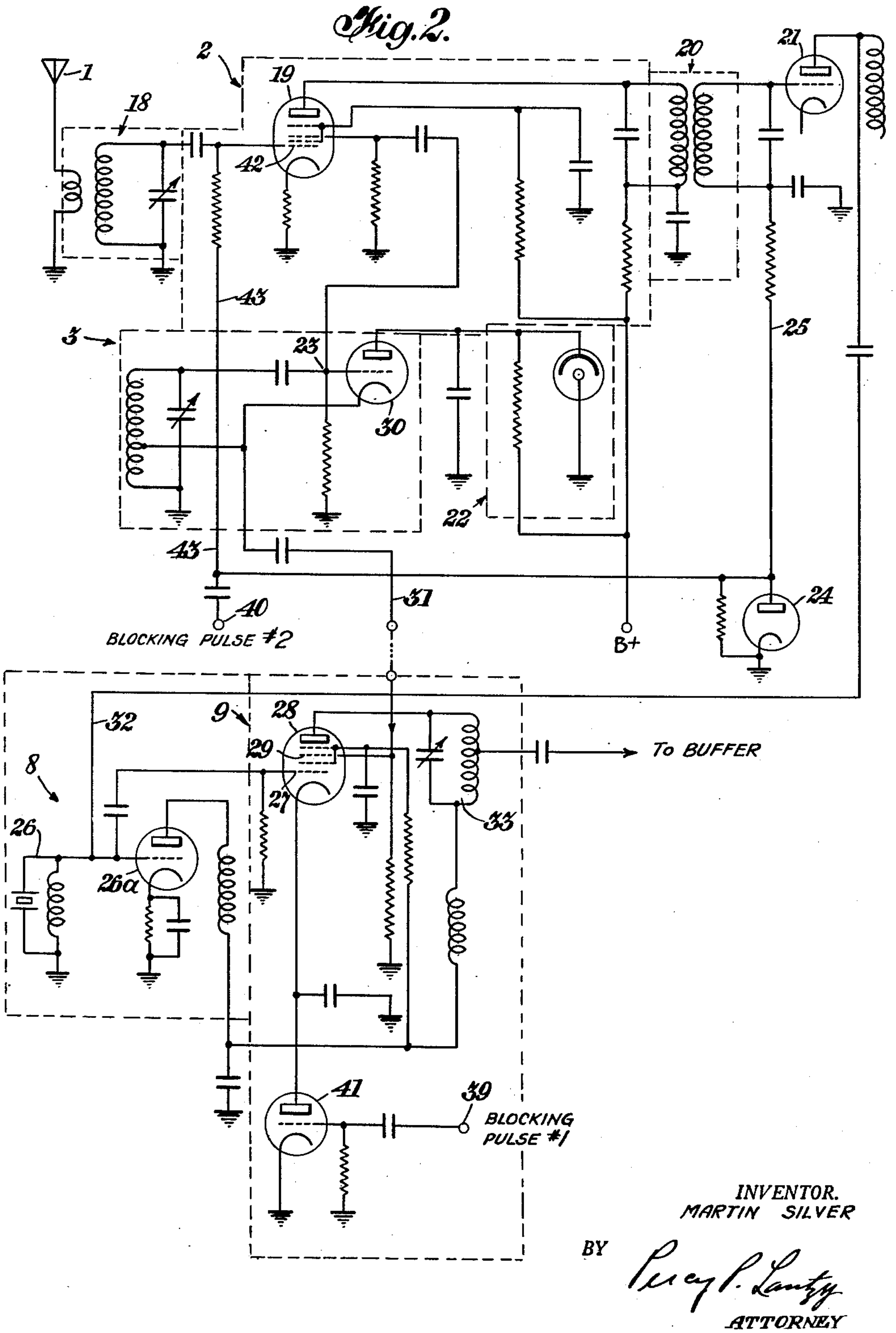
Fig. 2 is a diagram in schematic form of portions of the receiver and transmitter circuits of Fig. 1.

Referring to Fig. 1 a receiver-transmitter system is shown, wherein the receiver is a conventional type superheterodyne circuit including a receiving antenna 1 which leads into the mixer or first converter circuit 2 in which an incoming radio frequency signal is beat with a signal of a lower frequency originating from a local oscillator 3. The resulting intermediate frequency signal is amplified in a suitable intermediate frequency circuit 4 and subsequently detected in a detector circuit 5. It is then applied to an audio amplifier 6 in order to make available a suitable voltage for utilization in an audio device such as an oscilloscope 7 or a pair of earphones 7a. The receiver oscillator 3 and the converter 2 are shown tunable over a given range of frequencies providing a constant intermediate frequency to be amplified in the circuit 4.

The transmitter circuit is comprised of an oscillator 8 which has an output frequency equal to the intermediate frequency in circuit 4 of the receiver. This intermediate frequency output of the oscillator 8 is applied to a second converter or mixer 9 which also receives the variable frequency output of the receiver oscillator 3. The resulting high frequency output signal is applied in sequence to a buffer and output amplifier 10 and 11, respectively, for application to a transmitting antenna 12. The output of the amplifier 11 may be suitably modulated by a voltage obtained from a modulating circuit 13. The intermediate frequency signal output of the oscillator 8 is also applied to the intermediate frequency amplifier 4 in the receiver to provide a resulting beat frequency or signal as will be explained hereinafter. In order to avoid interference by the transmitter output with the functions of the receiver a blocking circuit 14 is provided which serves to control the alternate operation of the transmitter-receiver circuits by application of pulsating voltages to the converter 9 in the transmitter and to the converter 2 and the intermediate frequency amplifier 4 in the receiver. The tuning of the transmitter which is accomplished by variation of suitable parameters in the converter 9, the buffer amplifier 10, and the output amplifier 11, is mechanically ganged for simultaneous tuning with the receiver circuits by means of the ganged tuning mechanisms 15, 16, and 17.

In the detailed schematic representation of a portion of the receiver-transmitter circuit, as shown in Fig. 2, the antenna 1 of the receiver is coupled through a tuned coupling circuit 18 to a converter or mixer tube 19 in which in turn is linked through a coupling circuit 20 to an intermediate frequency amplifier 21. The remainder of the receiver circuit has not been shown as it may assume any one of a number of conventional forms for detecting and amplifying audio signals. The oscillator 3 of the receiver may comprise a Hartley type oscillating circuit including a voltage stabilizer shown at 22. The output of the oscillator 3 may be obtained at its grid 23 whence it is applied to one of the grids of the mixer 19. To prevent the grid of the intermediate frequency amplifier 21 from going negative at any time, a direct current inserter 24 may be provided for shifting the grid voltage zero over a connection 25.

The oscillator 8 of the transmitter may consist of a crystal oscillating circuit 26 and an amplifier 26a adapted to supply an output having a frequency value within the range of said intermediate frequency which is applied to grid 27 of a mixer tube 28 of converter 9. Another grid 29 receives a voltage corresponding to the signal obtainable from a triode 30 of the oscillating circuit 3 by way of a cathode-to-ground connection 31 of the said tube 30. A voltage corresponding to the intermediate frequency signal of the oscillating circuit 8 is also applied by way of a connection 32 to the plate circuit of the intermediate frequency amplifier 21 of the receiver. The beat frequency output of the mixer tube 28 in the transmitter is applied to the buffer amplifier 10 over a tuned coupling circuit 33, the remainder of the transmitter circuit not being shown in further detail.

Figure 3:
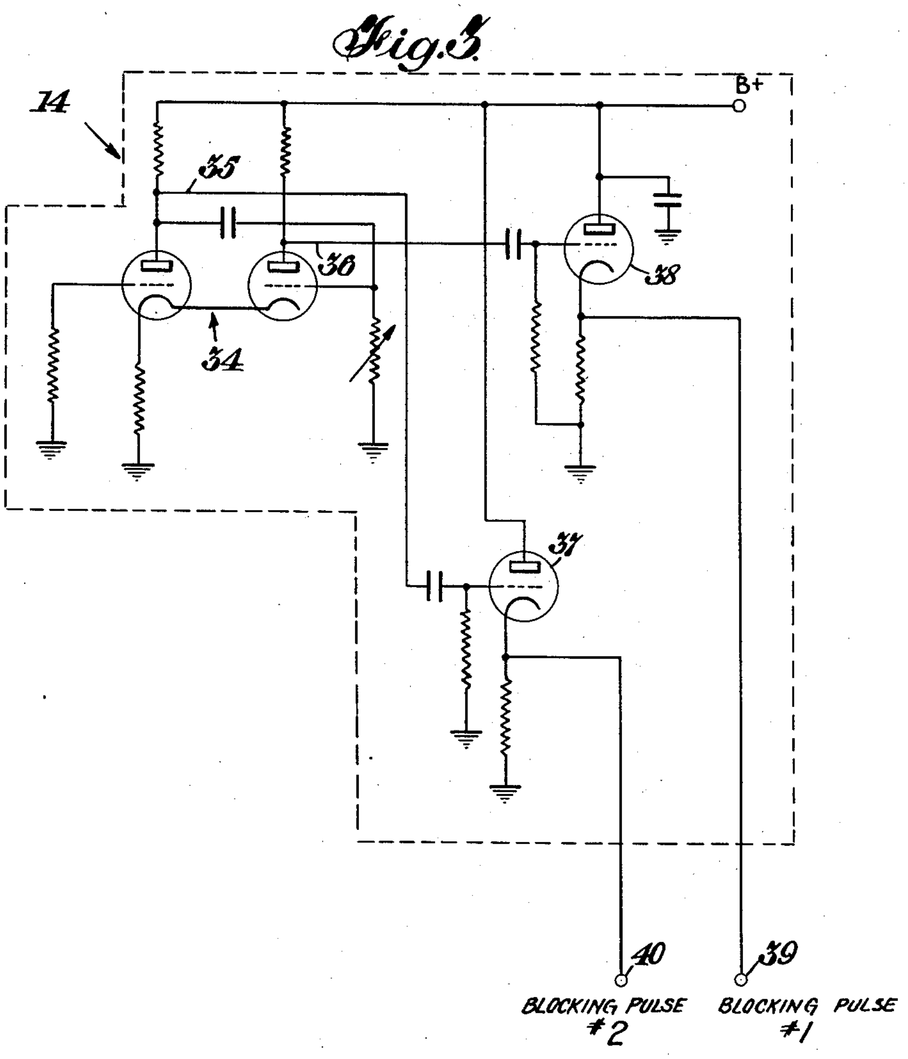
Fig. 3 is a schematic form of the blocking circuit of Fig. 1.

In Fig. 3 an example of a suitable circuit for supplying alternate blocking voltage pulses to the receiver and transmitter circuits is shown schematically and comprises in this instance, a multivibrator circuit 34 the positive and negative output pulses of which are obtained from the two plate circuits thereof at 35 and 36 respectively over the associated cathode follower amplifiers 37 and 38. A blocking pulse voltage of the type indicated in graph *a* of Fig. 4 may be obtained at terminal 39 and another blocking voltage of the type shown in graph *b* of Fig. 4 may be had at terminal 40 of the blocking circuit. The voltage of graph *a* may be applied to a keying tube 41 in the cathode circuit of the mixer 28, while the blocking voltage of graph *b* may be applied to a grid 42 of the mixer tube 19 in the receiver circuit by way of a connection 43. It is clear that during the interval indicated at 44 in graph *a* the transmitter will be operating while during the intervals 45 in graph *b* the receiver is in its operative state, a continuously alternating operation of the two main circuits thus being provided.

In operating the receiver-transmitter combination, the receiver circuit and with it the transmitter circuit may be tuned to a given frequency or be made to progressively scan a given frequency band by varying the frequency of the oscillator 3. If the incoming radio frequency of the signal is $f_s$, that of the frequency oscillator 3 is $f_o$ and the resulting intermediate frequency is $f_i$, then the beat frequency in the intermediate frequency amplifier 4 is:

$$f_s - f_o = f_i$$

and in the second converter 9

$$f'_i + f_o = f'_s$$

If the frequency of the oscillator 8 is also combined with the intermediate frequency in the amplifier 4 and the tuning of the oscillator 3 is varied another or a zero beat is obtained at the device 7 when $$f'_i - f_i = 0$$

In other words, when a zero beat is obtained in the device 7 the frequency of the transmitter $f'_s$ is substantially equal to $f_s$, which is the desired result. It is thus seen that I have provided an effective method and means for simultaneously and very simply tuning the signal frequency of a transmitter to a given frequency signal received by a receiver associated therewith.

While I have shown the receiver and transmitter circuits to be of a specific form it is of course understood that other types of receiver and transmitter circuits are equally suitable in achieving the objects of this invention as set forth hereinabove.

It is therefore clearly understood that this description is made only by way of example and not as a limitation on the scope of my invention as defined in the objects and accompanying specification.

I claim:

1. A system for causing interference with a transmitted signal by simultaneously transmitting on the frequency of said transmitted signal and receiving the said transmitted signal, comprising a receiving circuit of the superheterodyne type including a converter, an oscillator, an intermediate frequency amplifier, a detector, and an audio amplifier, and means coupled to said last-named amplifier by which its audio output may be observed; a locally associated transmitter circuit comprising an oscillator at a frequency in the range of said intermediate frequency, a converter, a buffer amplifier, and an output amplifier suitably coupled for transmission; connecting means for applying the output of said first named oscillator to said first named converter and to said second named converter, connecting means for applying the output of said second named oscillator to said intermediate frequency amplifier; a blocking voltage generator producing a positive and a negative output voltage and connecting means for applying one said voltage to said first named converter and to said intermediate frequency amplifier and the other said voltage to said second named converter; and coupled means for simultaneously varying the tuning of said first named converter, of said first oscillator, and of said second named converter.

2. A system according to claim 1, further including means for noise modulating said output amplifier connected thereto.

MARTIN SILVER.

References Cited in the file of this patent

UNITED STATES PATENTS

| Number | Name | Date |
|---|---|---|
| 1,433,599 | Bown | Oct. 31, 1922 |
| 2,113,419 | Young | Apr. 5, 1938 |
| 2,199,179 | Koch | Apr. 30, 1940 |
| 2,228,815 | Deehake | Jan. 14, 1941 |
| 2,281,982 | Leyn | May 5, 1942 |
| 2,317,547 | McRae | Apr. 27, 1943 |
| 2,363,583 | Gilman | Nov. 28, 1944 |
| 2,369,268 | Trevor | Feb. 13, 1945 |
| 2,379,395 | Ziegler et al. | June 26, 1945 |
| 2,402,606 | Davis | June 25, 1946 |
| 2,412,991 | Labin | Dec. 24, 1946 |
| 2,416,307 | Grieg | Feb. 25, 1947 |
| 2,418,139 | Preisman | Apr. 1, 1947 |
| 2,419,593 | Robinson | Apr. 29, 1947 |
| 2,447,490 | Collins | Aug. 24, 1948 |
| 2,457,134 | Doelz | Dec. 28, 1948 |